(No Model.) 2 Sheets—Sheet 1.
W. RITTER.
BORING AND MORTISING MACHINE FOR WOOD ARTICLES.
No. 551,171. Patented Dec. 10, 1895.
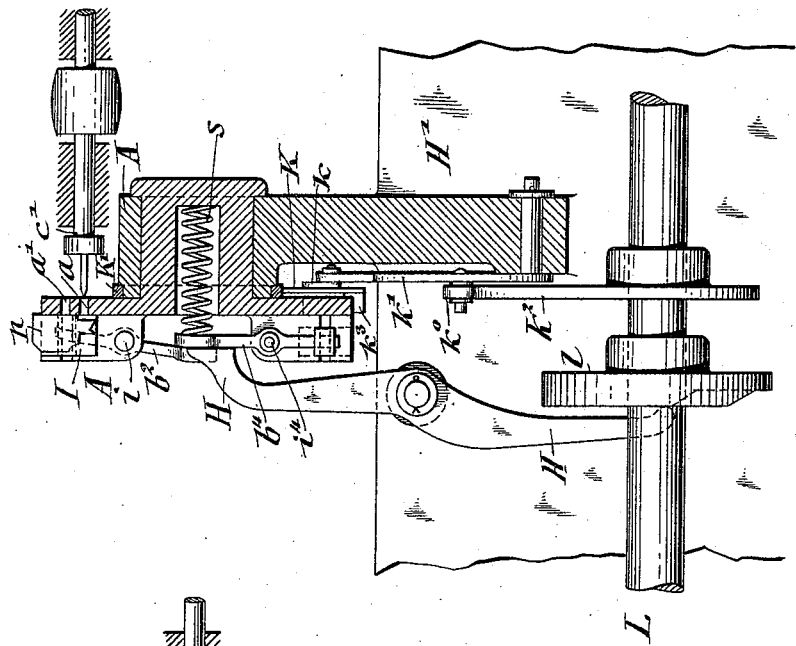
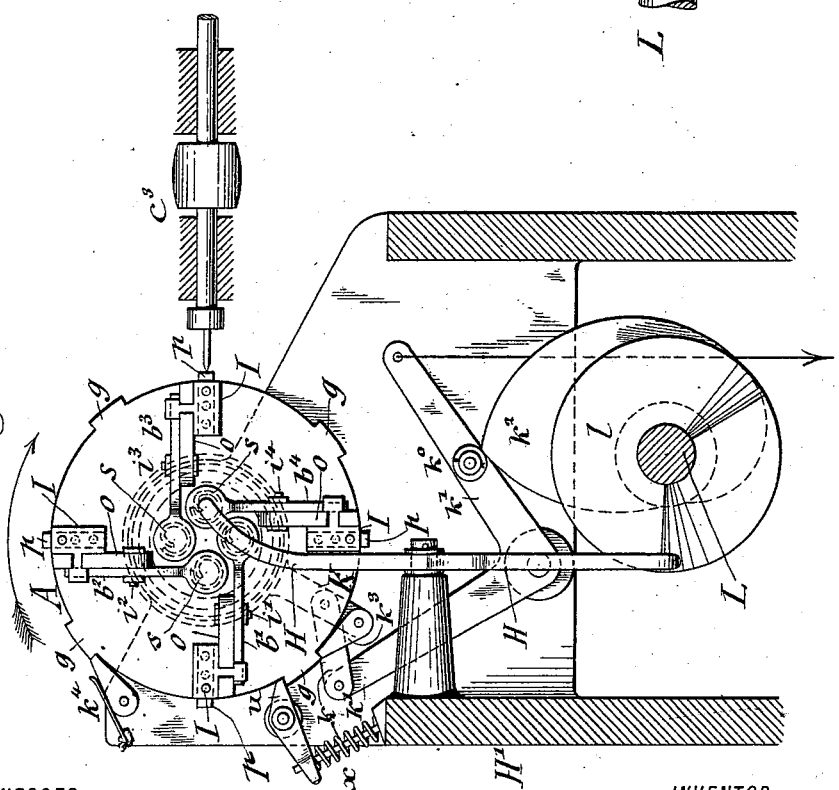
WITNESSES:
INVENTOR
Wilhelm Ritter
BY
ATTORNEYS.

(No Model.) 2 Sheets—Sheet 2.
W. RITTER.
BORING AND MORTISING MACHINE FOR WOOD ARTICLES.
No. 551,171. Patented Dec. 10, 1895.
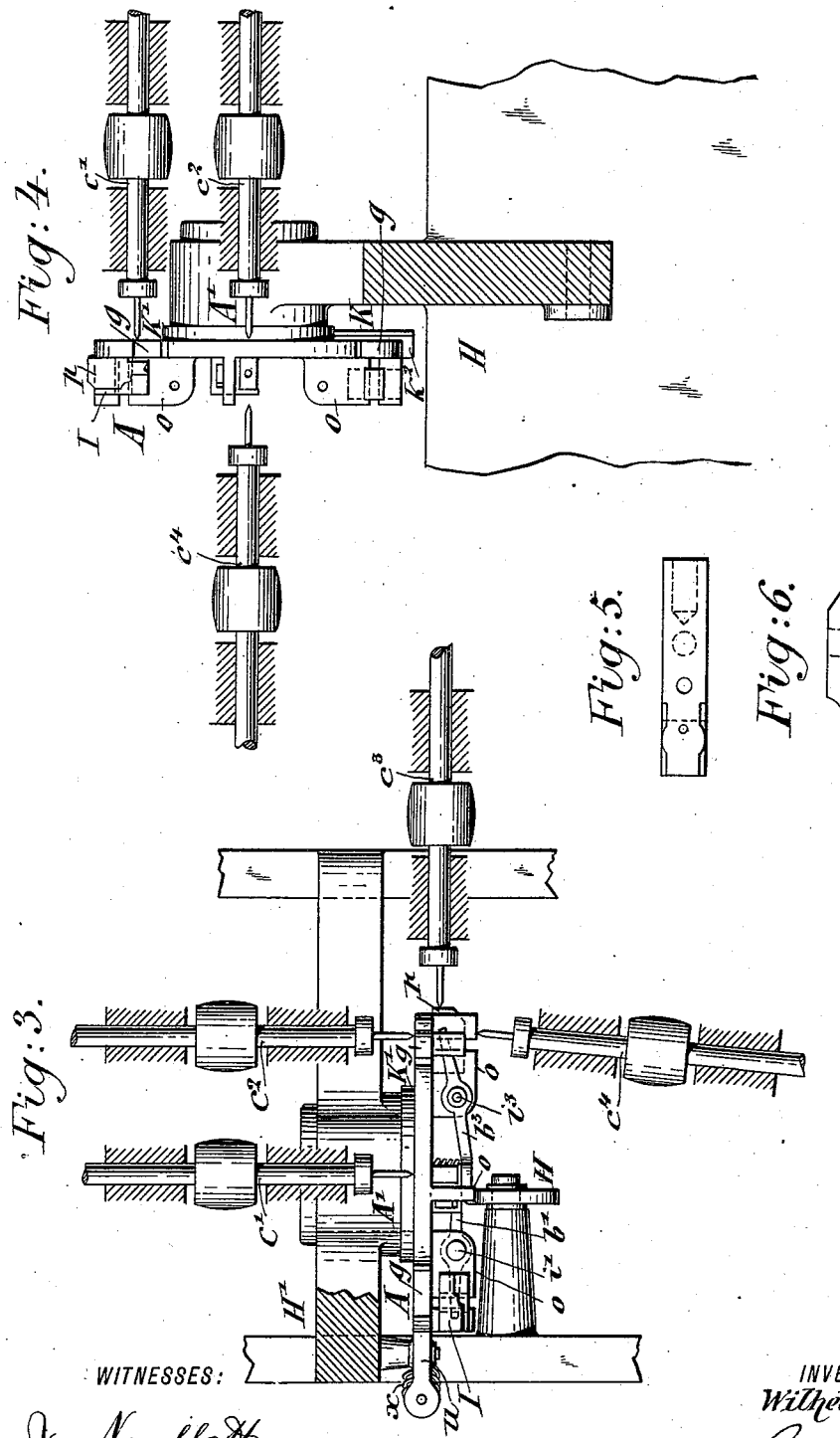
WITNESSES:
INVENTOR
Wilhelm Ritter
BY
ATTORNEYS.

UNITED STATES PATENT OFFICE.

WILHELM RITTER, OF ALTONA, GERMANY.

BORING AND MORTISING MACHINE FOR WOOD ARTICLES.

SPECIFICATION forming part of Letters Patent No. 551,171, dated December 10, 1895.

Application filed August 10, 1895. Serial No. 558,856. (No model.)

*To all whom it may concern:*

Be it known that I, WILHELM RITTER, a citizen of Germany, residing at Altona, Kingdom of Prussia, Germany, have invented certain new and useful Improvements in Boring and Mortising Machines for Wood Articles, of which the following is a specification.

This invention relates to an improved machine for boring and mortising the blanks for hammer-butts of piano-actions and other parts made from wood, which have to be provided with a certain number of holes or mortises at different portions of the surface of these parts.

The boring and mortising of the blanks for hammer-butts and other parts of piano-actions were heretofore accomplished on machines with a spindle against which the blank to be operated on was fed by hand or automatically, but in which machines only a single boring or mortising operation at a time could be performed, so that the blank to be operated on had to be successively subjected to a number of boring and mortising machines. Another method of boring and mortising the blanks for different parts of such piano-actions was accomplished by machines with a plurality of spindles, which had the disadvantage that only such holes or mortises which were not located too closely together could be made simultaneously, as the spindles could not be placed so near to each other. Smaller members of piano-actions, such as hammer-butts, could not receive all their holes or mortises on passing once through a single machine.

In the machines heretofore in use the removal of the completed part, as well as the introduction of a new blank to be operated on, could also be accomplished when the spindles were moved to a sufficient distance from the blank to be operated upon. Consequently during the time required for removing and introducing the blank the spindles are rotated without performing any work, so that the machine is operated without work effect during this period of time.

The object of this invention is to supply a machine by which the foregoing disadvantages are overcome, and by the continuous operation of which completely bored and mortised portions of piano-actions are produced without regard to the kind and shape of the bored holes and their distance from each other.

The invention consists of a boring and mortising machine, the parts and operation of which will be fully described hereinafter, and which will finally be defined in the claims.

In the accompanying drawings, Figure 1 represents a front elevation of the machine, part of the frame being in section. Fig. 2 is a sectional side elevation of the same. Fig. 3 is a plan view thereof, partly in section, with parts removed. Fig. 4 is a side elevation in which also some of the parts are removed and others are in section, and Figs. 5 and 6 are respectively a top and side view of a hammer-butt which has been bored and mortised by my improved machine.

Similar letters of reference indicate corresponding parts.

The main part of my improved machine for boring and mortising blanks for hammer-butts and other similar pieces from wood is a supporting disk or head A by which the blanks are supported. Around the supporting-disk A are arranged the boring and mortising mechanisms of the spindles $c'$ $c^2$ $c^3$ $c^4$, which are moved forward by any approved means (not shown) against the blank to be operated on. On the work-supporting disk A are arranged levers $b'$ $b^2$ $b^3$ $b^4$, which turn on fulcrums $i'$ $i^2$ $i^3$ $i^4$, which carry at their outer ends a holder I that corresponds to the shape of the blank to be formed, said holders being guided by their shanks in slots of radial ribs $o$ of the work-supporting disk A, so that by the pressure of springs $s$ under the inner ends of the levers and arranged in sockets in the disk A the blanks $p$ are pressed against the disk A and firmly supported on the latter. The inner ends of the levers $b'$ $b^2$ $b^3$ $b^4$, which are pressed by the helical springs in outward direction, as shown in Fig. 2, (only one spring being, however, shown, as the section is taken to one side of the axis of the disk A,) pass during the rotation of the disk A under and in contact with the upper end of a lever H, which is fulcrumed to the supporting-frame H' of the machine, and the lower end of which is guided over the face of a cam-disk $l$, so that the operating upper end of the lever H presses intermittently on the inner ends of the levers $b'$ $b^2$ $b^3$ $b^4$ and produces thereby the release of the hammer-butt or other finished part.

Intermittent rotary motion is imparted to the work-supporting disk A by means of a pawl-and-ratchet mechanism, which consists of a pawl $k^3$, pivoted to the outer end of a radial arm that is provided with a ring-shaped part K', which turns loosely on the bearing A' of the disk and which arm is connected by a link $k$ with a fulcrumed elbow-lever $k'$, which latter is provided with an antifriction-roller $k^0$ that moves on the circumference of the cam $k^2$ and on the same driving-shaft L on which the cam-disk $l$ is mounted. The pawl $k^3$ engages one end of each of the equidistantly-arranged projections or teeth $g$ at the circumference of the rotary disk A, which correspond in number to that of the holders I and their co-operating parts. The opposite end of each radial projection $g$ is engaged by a check-pawl $u$ that is acted upon by a helical spring $x$, whereby one projection $g$ of the disk is moved against the detent $k^4$ that is pivoted to the supporting-frame of the machine, and the next projection $g$ is placed in engagement with said detent during the releasing action of the motion-transmitting pawl $k^3$.

The operation of the machine is as follows: The attendant inserts into the holder I of the lever $b'$, which is closest to him, (see Fig. 3,) the blank $p$ after the lever H has raised the holder. As soon as the lever $b'$ is released from the lever H, the blank is pressed against the disk A, after which the latter is turned in the direction of the arrow, Fig. 1, for a quarter-revolution, so that the disk is brought to rest and the blank placed in line with the boring-tool of the spindle $c'$, which is then moved forward and a hole bored in the end of the blank. During this time a second blank is introduced under the next holder I, acted upon by the lever $b^4$, after which the next intermittent motion of the disk A places the second blank in front of the spindle $c'$ for receiving a mortise, while the first blank, as also the second, is successively carried by the intermittent motions of the disk A past the boring-tools of the spindles $c^2$ $c^3$ $c^4$, which are located in such relative position toward the disk that the blanks are provided with holes of proper depth and inclination at the required points. With each quarter-rotation of the disk a new blank is inserted and the blanks are successively acted upon by the boring-tools of the spindles. The relative arrangement of the spindles of the boring-tools to the work-supporting disk is as follows: Spindle $c'$ is arranged at the upper part of the back of the disk at right angles to the same, while spindle $c^2$ is parallel with the spindle $c'$, but is arranged below and to one side of the same and is also farther from the axis of the disk. The spindle $c^3$ is arranged at right angles to the spindle $c^2$ at one side of the disk, and is located in a plane parallel with that of the disk. The fourth and last spindle $c^4$ is arranged in front of the disk and at an angle to the same, all three spindles $c^2$, $c^3$, and $c^4$ being located in substantially one plane, so that their boring-tools can act simultaneously on the blank. For the purpose of permitting the action of the boring-tools of the first two spindles $c'$ $c^2$ the disk has two holes $a$ $a'$, that are in radial alignment and are arranged near the circumference of the disk.

If it be desired that the blanks should be operated on by a greater number of boring-tools, the intermittent rotary motion of the work-supporting disk A can be accomplished in shorter and more frequent periods of time. It appears therefore that the blank can be conducted without interruption to the successive action of all the boring-tools and thereby provided with holes and mortises which can be located very close to each other.

Any approved mechanism for moving the spindles forward and withdrawing the same after the boring action is accomplished can be used, as this feature is well known and forms no part of my invention.

Having thus described my invention, what I claim as new, and desire to secure by Letters Patent, is—

1. The combination, in a machine for boring and mortising blanks of hammer-butts and the like, of an intermittently rotatable work-supporting disk provided with several radially-arranged sets of transverse openings, holders for the blanks, arranged on the face of the disk, and reciprocating and rotary spindles provided with boring tools, two of said spindles being arranged at the back of the disk, while one of said pair of spindles is arranged nearer the axis of the disk than the other and the boring tools of said pair are adapted to work through said radially-arranged openings, substantially as set forth.

2. The combination in a machine for boring and mortising blanks of hammer-butts and the like, of an intermittently rotatable work-supporting disk, holders for the blanks, and four reciprocating and rotary spindles provided with boring-tools, the first of said spindles being arranged at right angles to the top part of the disk, the second, third and fourth spindles being arranged in substantially the same plane, but below the first spindle, while the second spindle is parallel with the first, the third is located at right angles to the second, parallel with the disk, and the fourth is located in front of the disk, at an angle of inclination thereto, substantially as set forth.

3. The combination in a machine for boring and mortising blanks of hammer-butts and the like, of an intermittently rotatable work-supporting disk, spring-pressed radial levers fulcrumed on the face of the disk, and carrying holders for the blanks at their outer ends, means for guiding the holders to and from the face of the disk, a fulcrumed cam-actuated presser lever having one end extending in the path of movement of the same ends of the levers on the disk, and boring-devices, substantially as set forth.

In testimony that I claim the foregoing as my invention I have signed my name in presence of two subscribing witnesses.

W. RITTER.

Witnesses:
JOHN KEMPF,
WM. ARNEMANN.